(12) United States Patent
Joritz et al.

(10) Patent No.: US 9,816,154 B2
(45) Date of Patent: Nov. 14, 2017

(54) PROCESS GAS PREPARATION APPARATUS FOR AN INDUSTRIAL FURNACE SYSTEM AND AN INDUSTRIAL FURNACE SYSTEM FOR GAS CARBURIZING AND HARDENING OF METAL WORKPIECES UTILIZING SAME

(71) Applicant: Ipsen, Inc., Cherry Valley, IL (US)

(72) Inventors: Dirk Joritz, Wesel (DE); Nils Bernhagen, Kleve (DE); Aloys Heisterkamp, Kleve-Rindern (DE); Markus Reinhold, Ebendorf (DE); Bernd Edenhofer, Kleve (DE)

(73) Assignee: Ipsen, Inc., Cherry Valley, IL (US)

( * ) Notice: Subject to any disclaimer, the term of this patent is extended or adjusted under 35 U.S.C. 154(b) by 0 days.

(21) Appl. No.: 15/070,494

(22) Filed: Mar. 15, 2016

(65) Prior Publication Data
US 2016/0273065 A1 Sep. 22, 2016

(30) Foreign Application Priority Data
Mar. 16, 2015 (DE) .................... 20 2015 001 980 U

(51) Int. Cl.
*C21D 9/00* (2006.01)
*C21D 1/74* (2006.01)
(Continued)

(52) U.S. Cl.
CPC ........ *C21D 9/0006* (2013.01); *B01J 19/0006* (2013.01); *B01J 19/24* (2013.01); *C21D 1/18* (2013.01); *C21D 1/74* (2013.01); *C21D 1/76* (2013.01); *C21D 1/763* (2013.01); *C23C 8/20* (2013.01); *F27B 5/16* (2013.01); *F27D 3/16* (2013.01); *F27D 7/06* (2013.01); *F27D 19/00* (2013.01); *B01J 2219/00162* (2013.01); *B01J 2219/00164* (2013.01);
(Continued)

(58) Field of Classification Search
CPC ..................................................... B01J 19/0006
USPC ........................................................... 502/56
See application file for complete search history.

(56) References Cited

U.S. PATENT DOCUMENTS 2,656,258 A * 10/1953 Symonds .................... B01J 8/36
208/164
2,882,130 A * 4/1959 Porter .................... C01B 17/161
423/443
(Continued)

*Primary Examiner* — Scott Kastler
(74) *Attorney, Agent, or Firm* — Dann, Dorfman, Herrell and Skillman, P.C.

(57) ABSTRACT

A process gas preparation device for an industrial furnace system is disclosed. The gas preparation device includes a preparation reactor having a catalyst. A gas feed line and a gas return line are connected between the industrial furnace and the preparation reactor to form a closed loop. A compressor is situated upstream from the preparation reactor in the feed line. The preparation reactor is also connected with supply lines for hydrocarbon gas and air to be supplied to the preparation reactor. The process gas preparation device also includes a control device with which process gas preparation and return can be regulated and controlled. The gas feed line also has a shut-off valve. The control device can check the functional state of the catalyst by measuring the pressure differential across the catalyst and can initiate a burn-out process therein to clear clogging of the catalyst.

10 Claims, 2 Drawing Sheets

(51) Int. Cl.
*C21D 1/76* (2006.01)
*F27B 5/16* (2006.01)
*F27D 7/06* (2006.01)
*B01J 19/00* (2006.01)
*B01J 19/24* (2006.01)
*C21D 1/18* (2006.01)
*C23C 8/20* (2006.01)
*F27D 3/16* (2006.01)
*F27D 19/00* (2006.01)

(52) U.S. Cl.
CPC .. *B01J 2219/00252* (2013.01); *B01J 2219/24* (2013.01); *F27D 2003/168* (2013.01); *F27D 2019/0031* (2013.01); *F27D 2019/0084* (2013.01)

(56) References Cited

U.S. PATENT DOCUMENTS

| | | |
|---|---|---|
| 8,333,852 B2 | 12/2012 | Grobler et al. |
| 8,747,731 B2 | 6/2014 | Grobler et al. |
| 2009/0324454 A1 | 12/2009 | Nakano et al. |
| 2016/0273065 A1* | 9/2016 | Joritz .................. F27B 5/16 |

* cited by examiner

PROCESS GAS PREPARATION APPARATUS FOR AN INDUSTRIAL FURNACE SYSTEM AND AN INDUSTRIAL FURNACE SYSTEM FOR GAS CARBURIZING AND HARDENING OF METAL WORKPIECES UTILIZING SAME

BACKGROUND OF THE INVENTION

Field of the Invention

The invention relates to a process gas preparation device for an industrial heat treating furnace system. In addition, the invention relates to an industrial heat treating furnace system for gas carburizing and hardening of metal workpieces which includes the aforementioned process gas preparation device.

Description of the Related Art

Industrial furnace systems usually make use of process gases, which serve to protect the surface of the metal workpieces to be treated in the respective industrial furnace and also to change the chemical composition of such workpieces. When hardening metal workpieces, it is known to carburize the workpieces by the use of the process gas. The process gas in such case is usually composed of a protective gas including carbon monoxide, hydrogen, and nitrogen, carbon dioxide, oxygen, and/or water vapor, as constituents, as well as a hydrocarbon enrichment gas for the carburizing process. In a treatment chamber of the respective industrial furnace into which the metal workpiece is introduced for the carburizing process and hardening, an excess pressure is to be generated with the process gas, so as to prevent ambient air from inadvertently entering the furnace chamber. Such condition also guarantees a carbon level in the treatment chamber sufficient for carburization of the metal workpieces.

The treatment chamber of the known industrial heat treating furnace is typically rinsed with process gas, i.e., the process gas is continuously flowed through the treatment chamber. After the process gas flows through the chamber, the gas is routed to a burn-off location of the industrial furnace where the process gas is discharged and then safely ignited by a pilot burner and burned. However, since this results in a correspondingly large consumption of process gas, and corresponding higher emissions also arise in the area of the industrial furnace, there are known systems in which the process gas is regenerated or prepared in a closed loop after flowing through the treatment chamber of the respective industrial furnace. The recycled process gas is subsequently available for renewed supply to the treatment chamber of the industrial furnace.

Known from U.S. Pat. No. 8,333,852 is an industrial furnace system for gas carburizing and hardening of metal workpieces, in which a process gas preparation device is provided in the area of an industrial furnace having a treatment chamber. This process gas preparation device includes a preparation reactor having a catalyst therein. The preparation reactor is connected with the treatment chamber of the furnace system by a gas feed line, so that spent process gas can be conducted out of the treatment chamber and into the preparation reactor. Also provided between the preparation reactor and the treatment chamber of the industrial furnace is a gas return line, which functions to return the process gas from the preparation reactor back into the treatment chamber of the industrial furnace. In this way the furnace treatment chamber and the preparation reactor are connected in a closed loop through the gas feed and return lines. In addition, a hydrocarbon gas and/or air can be supplied to the preparation reactor by respective additional feed lines so as to be able to prepare or regenerate the spent process gas by reaction with the catalyst and provide a desired carbon content. In order to supply the spent process gas to the preparation reactor and return it into the treatment chamber of the industrial furnace, the feed line incorporates a compressor, which is controlled by means of a control device that also regulates process gas preparation and return.

Proceeding from the state of the art as described above, it is an object of the present invention to provide a process gas preparation device for an industrial furnace system, wherein this process gas preparation device is intended to make it possible to configure a preparation of spent process gas and a supply thereof to the industrial furnace as optimally as possible.

SUMMARY OF THE INVENTION

According to a first aspect of the invention, a process gas preparation device includes a preparation reactor which contains a heatable, temperature-controlled catalyst, and to which spent process gas from the industrial furnace can be conducted via a gas feed line. The process gas prepared at the preparation reactor can be conducted back to the industrial furnace via a gas return line. A compressor is provided in the gas feed line and is located upstream from the preparation reactor. The preparation reactor is also connected with additional gas feed lines through which hydrocarbon gas and air respectively can be supplied to the preparation reactor. Further, a control device is provided in the process gas preparation device and is programmed to control the operation of the process gas preparation device.

In accordance with another aspect of the invention, the aforementioned process gas preparation device is arranged as part of an industrial heat treating furnace system for gas carburizing and hardening of metal workpieces, which in addition to the process gas preparation device includes an industrial heat treating furnace having a treatment chamber. The preparation reactor of the process gas preparation device is connected with the treatment chamber of the industrial heat treating furnace by means of the gas feed line and the gas return line in a closed loop.

In carrying out the invention, the process gas supplied to the treatment chamber for gas carburization includes in particular a carrier gas and an enrichment gas. The carrier gas typically includes carbon monoxide and hydrogen, while the enrichment gas includes a hydrocarbon gas. In general, the gas carburization and hardening of metal workpieces in the industrial furnace is performed in a way that is generally known to the skilled person by use of the process gas as also described in U.S. Pat. No. 8,333,852, the entirety of which is incorporated herein by reference. The preparation or regeneration of the spent process gas in the preparation reactor of the process gas preparation device also occurs in a way that is in principle known to the expert in the form of a carbon level enrichment, wherein the reactions cited in U.S. Pat. No. 8,333,852, such as

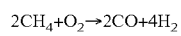

$$2CH_4 + O_2 \rightarrow 2CO + 4H_2$$

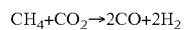

$$CH_4 + CO_2 \rightarrow 2CO + 2H_2$$

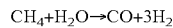

$$CH_4 + H_2O \rightarrow CO + 3H_2$$

run their course, as a result of which carbon enrichment takes place in the treatment chamber.

It is preferred that the carbon level be monitored continuously in the treatment chamber of the industrial heat treating furnace, for example, by using an oxygen probe to measure the oxygen partial pressure and one or more thermocouples for measuring the temperature inside the treatment chamber. If the interaction between the process gas and a surface of the workpiece(s) and the accompanying carbon removal from the gas reveals a reduction in the carbon level, the process gas preparation device initiates a corresponding enrichment by supplying additional hydrocarbon gas, preferably in the form of natural gas.

The process gas preparation and transfer to the treatment chamber of the industrial furnace is monitored and regulated by the control device of the process gas preparation device, which preferably is embodied as an electronic, computer-assisted, and programmable controller. To this end, the control device is provided with corresponding parameters of the industrial furnace, including among other things, the current carbon level in the treatment chamber, the prevailing temperature therein, etc. In addition, the control device is connected in particular with a pressure sensor in the treatment chamber with which the prevailing pressure inside the treatment chamber is continuously measured and monitored. If a deviation from a prescribed desired pressure set point is determined during the performance of the carburizing process, then corrective action can be taken. For example, a gas pressure increase can be effected by adding hydrocarbon gas and air to the preparation reactor. Alternatively, a gas pressure decrease can be realized by briefly removing process gas from the closed loop, for example, by conducting the process gas to a burn-off location.

The invention also includes the technical feature that the gas feed line of the process gas preparation device also has a shut-off valve, with which the flow of spent process gas to the preparation reactor can be interrupted. In other words, the gas feed line to the preparation reactor is provided with a shut-off valve, with which the gas feed line can be sealed, and a flow of spent process gas into the preparation reaction can be precluded accordingly. In addition, the control device is configured to check the functional state of the catalyst by measuring the pressure differential between the inlet and the outlet of the catalyst. The control device is programmed to initiate a burn-out process in the catalyst in a targeted manner. In particular, the control device monitors the catalyst of the preparation reactor by performing the pressure differential measurement on the catalyst. If a significant pressure differential is detected during the process, then the catalyst has become clogged with soot or other debris. The control device then initiates a burn-out process in the catalyst to combust the soot or other debris that caused the clogging.

An advantage of the process gas preparation device according to the invention is that the shut-off valve can be operated to prevent the flow of spent process gas to the preparation reactor in a targeted manner. In that condition the industrial furnace is supplied solely with the process gas newly generated in the preparation reactor by supplying air and hydrocarbon gas in combination. Another advantage of the inventive arrangement is the continuous monitoring of the catalyst by the control device and the ability to initiate a burn-out process to ensure the long term functional efficiency of the catalyst. Considered as a whole, the combination of features according to the present invention makes it possible to optimally design the process gas preparation method.

By contrast, the arrangement described and shown in U.S. Pat. No. 8,333,852 does not provide for a shut-off valve in the gas feed line to the preparation reactor, and consequently does not provide any capability of shutting off the feed of the spent process gas to the preparation reactor. In the arrangement described and shown in U.S. Pat. No. 8,333,852, it is therefore not possible to prevent the flow of spent process gas to the preparation reactor in a targeted manner. In addition, a functional state of the catalyst is not monitored, and no targeted burn-out cycle of soot or other debris in the catalyst is introduced.

In one embodiment according to the invention, the gas feed line includes a cooler upstream from the compressor. As a result, the spent process gas discharged from the treatment chamber of the industrial furnace can advantageously be cooled before the compressor, thereby diminishing any impairment to the compressor by the otherwise still hot process gas. The cooler also provides the benefit of preventing an undesired breakdown of the process gas by using a slow cooling process. According to an embodiment of the invention, the cooler can be realized as a simple heat exchanger, for example, in the form of a line with a serpentine progression, through which heat is transferred to the ambient air around the industrial furnace. In a heat exchanger configured in this way, however, it is especially preferred to also provide a blower for forcibly directing ambient air over the heat exchanger to increase the heat transfer.

In another possible embodiment of the invention, mass flow controllers are provided in the respective supply lines for the hydrocarbon gas and air thereby making it possible to control the respective quantities of the hydrocarbon gas and/or air supplied to the preparation reactor. This embodiment provides the advantage that the supply of air and/or hydrocarbon gas to the preparation reactor can be precisely regulated through the use of the respective mass flow controller which receives mass flow rate set points from the control device.

In a further embodiment according to the invention, the control device is connected with the compressor, the shut-off valve, and the mass flow controllers, to control and regulate the operation of each of those devices. If a cooler with a controllable component, such as a variable speed blower, is provided in the gas feed line from the treatment chamber, the controllable component can also be connected with the control device, so that it too can be controlled via the control device.

In another embodiment according to the invention, the preparation reactor, the compressor, the mass flow controllers, the shut-off valve, and the control device are all contained in a shared housing. If a cooler is also provided in the gas feed line ahead of the compressor, then the cooler is preferably also located in the same housing as the other components of the gas preparation device. In particular, this may be realized by providing the process gas preparation device in its own housing, outside of the industrial heat treating furnace. In principle, however, the aforementioned components can be combined into a shared housing by locating the process gas preparation device within the same housing as the industrial furnace system.

However, within the framework of another embodiment of the invention in which the process gas preparation device is at least partially integrated into the industrial furnace, the preparation reactor is preferably located under the treatment chamber and the mass flow controllers for the preparation reactor are located in a gas mixer tap of the industrial furnace, and the control device is installed in a control cabinet of the industrial furnace. This enables an especially compact integration of the process gas preparation device into the industrial furnace system.

When placing the process gas preparation device outside of the respective industrial furnace, a retrofitting is generally possible for an already existing industrial furnace, while full or at least partial integration can be used in particular for newly manufactured industrial furnaces.

In another embodiment of an industrial furnace system according to the invention, the treatment chamber is connected to a burn-off location by an exhaust gas line. The exhaust gas line includes a valve with which the exhaust gas line can be shut off during process gas preparation. By shutting off the process gas discharge line, spent process gas can be prevented from flowing to the burn-off location and is conducted to the process gas preparation device as desired instead. The conducting of the process gas to the burn-off location can be initiated in a targeted manner when the pressure inside the treatment chamber exceeds a preselected set point value. In this regard, it is especially preferred that the control device of the process gas preparation device be connected to the shut-off valve so that the shut-off valve can be operated by the control device. The shut-off valve in the exhaust gas line is preferably a gastight valve so that there is no leakage of process gas to the burn-off location.

In a still further embodiment according to the invention, the gas feed line and the gas return line are connected with the treatment chamber by means of one or more process gas lances. The lance or lances are connected to the gas feed line and to the gas return line. In this way, a suitable supply of spent process gas to the process gas preparation device and return to the treatment chamber of the furnace can be established, preferably through a single port or opening in the furnace wall and through the treatment chamber wall. In a preferred embodiment, the process gas lance comprises concentric coaxial tubes that pass through a port in the furnace wall. One of the coaxial tubes is connected to the gas feed line and the other coaxial tube is connected to the gas return line. In this embodiment, the process gas flows out of the treatment chamber through one of the coaxial tubes and the prepared or regenerated process gas flows into the treatment chamber through the other coaxial tube. Apart from the above, however, it is also conceivable within the framework of the invention to realize the supply and removal of process gas at points spaced widely apart, or even to provide several respective points for the supply and removal of process gas.

The invention is not limited to the indicated combination of features in the main claim or the claims dependent thereon. There are also ways in which to combine individual features, even those derived from the claims, the following description of preferred embodiments of the invention, or directly from the drawings. Any reference by the claims to the drawings through the use of reference numbers is not intended to limit the protective scope of the claims.

BRIEF DESCRIPTION OF THE DRAWINGS

Advantageous embodiments of the invention described below are depicted in the drawings wherein.

DETAILED DESCRIPTION

Figure 1:
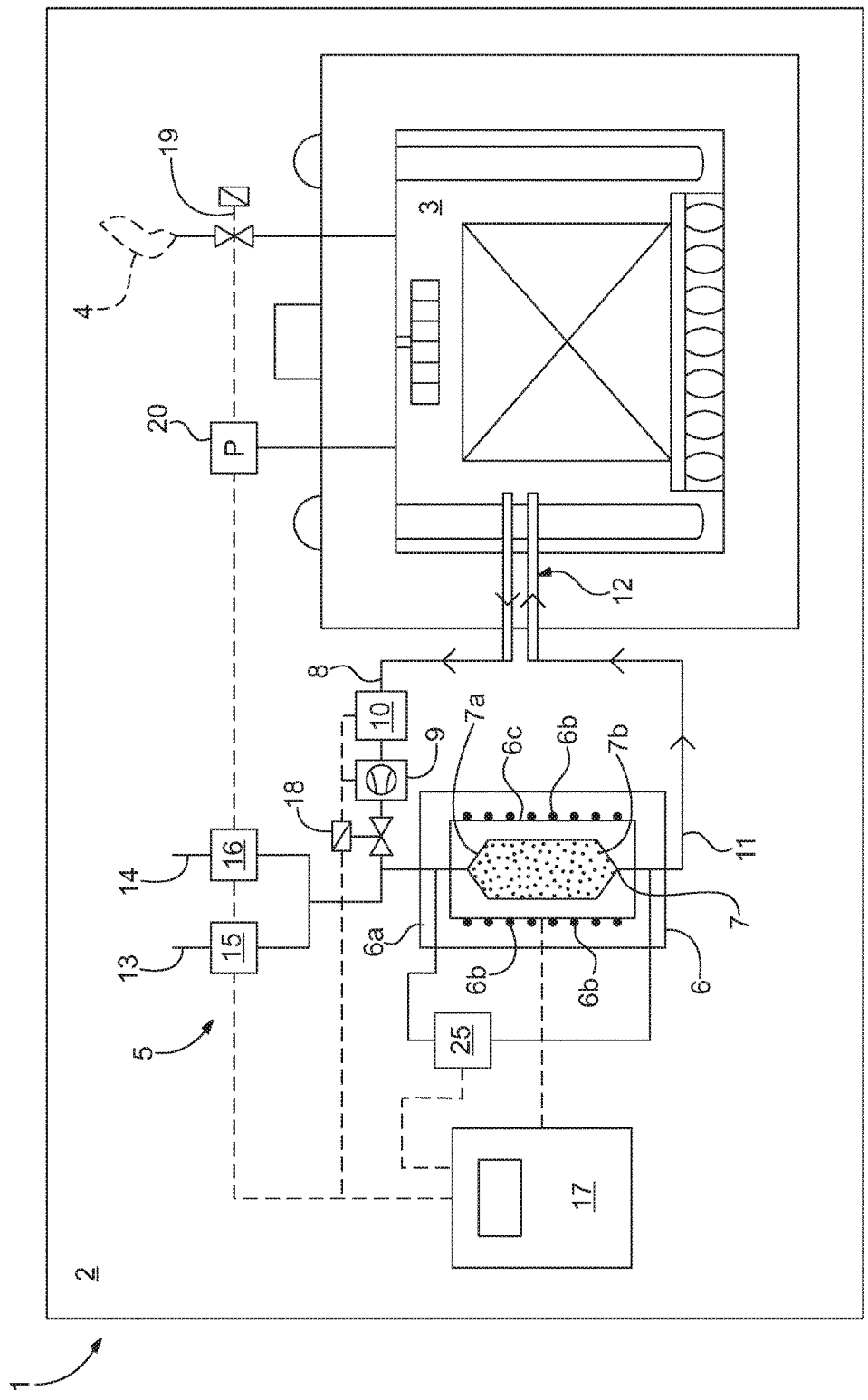
FIG. 1 is a schematic view of an industrial furnace system with a process gas preparation device corresponding to a first embodiment of the invention.

Visible on FIG. 1 is a schematic view of an industrial furnace system 1 corresponding to a first embodiment of the invention, wherein this industrial furnace system 1 includes an industrial heat treating furnace 2, in which is located a treatment chamber 3 for the heat treatment of metal workpieces. The heat treatment is set up in such a way as to expose the workpieces introduced into the treatment chamber 3 to gas carburization and hardening heat treatments which are known in principle to the skilled person. In carrying out the carburizing heat treatment the treatment chamber 3 is continuously supplied with a process gas under a positive (i.e., superatmospheric) pressure. The process gas is composed of a carrier gas typically comprising carbon monoxide and hydrogen and an enrichment gas, typically a hydrocarbon gas.

In the apparatus according to the present invention, the treatment chamber 3 is not rinsed with the process gas, i.e., the process gas supplied to the treatment chamber 3 is not subsequently flared off at a burn-off location 4. Rather the process gas spent during gas carburization is recycled and regenerated for further use. To this end, the industrial furnace system 1 is equipped with a process gas preparation device 5, which has a preparation reactor 6. The preparation reactor 6 includes an insulated housing 6a, heating elements 6b, and a heating chamber 6c.

Located inside of the preparation reactor 6 is a catalyst 7 in which the process gas is prepared via corresponding enrichment with carbon. The catalyst 7 includes a gas-tight container 7a which is constructed and arranged to hold the catalytic material 7b. Suitable catalytic materials are described in U.S. Pat. No. 8,333,852. The spent process gas is conducted out of the treatment chamber 3 by means of a gas feed line 8 to the preparation reactor 6, and thus, to the catalyst 7. The gas feed line 8 includes a compressor 9 with a cooler 10 both of which are located upstream from the preparation reactor 6. The cooler 10 is preferably designed as a heat exchanger with a blower by which ambient air of the industrial furnace 2 can be forced over the heat exchanger to increase the heat transfer.

The process gas prepared in the catalyst 7 is conducted back to the treatment chamber 3 via a gas return line 11. The gas feed line 8 and the gas return line 11 are connected to the treatment chamber 3 by a process gas lance 12 that traverses an opening or port through the walls of the heat treating furnace and the treatment chamber. In addition, gas supply lines 13 and 14 are also connected to the preparation reactor 6, whereby the preparation reactor 6 can be supplied with hydrocarbon gas via the supply line 13 and/or with air via the supply line 14. The supply lines 13 and 14 include respective mass flow controllers 15 and 16, with which the quantity of gas flowing through the respective supply line 13 or 14 can be precisely regulated or adjusted.

The regeneration or preparation of process gas and its return to the treatment chamber 3 is regulated and controlled by a control device 17 of the process gas preparation device 5. The control device 17 is preferably configured as an electronic, computer-assisted and/or programmable controller. The control device 17 is connected with the catalyst 7, with the compressor 9 and cooler 10 (if present), as well as with the mass flow controllers 15 and 16. The control device 17 is further connected to two shut-off valves 18 and 19, of which the shut-off valve 18 is connected in the gas feed line 8 and the shut-off valve 19 is connected in an exhaust line that extends from the treatment chamber 3 to a burn-off location 4. Further, the control device 17 is connected with a pressure sensor 20 which is mounted in the treatment chamber 3 to continuously monitor the pressure in the treatment chamber. The control device 17 is configured to receive other parameters of the treatment chamber 3, including in particular the current temperature in the treatment chamber 3, as well as a carbon content of the process gas present therein.

The return of the process gas via the gas return line 11 is regulated by the control device 17 as a function of the pressure in the treatment chamber 3. If the control device detects that the pressure is too low, the control device 17 acts to increase the gas pressure by signaling the mass flow controller 15 and/or the mass flow controller 16 to add hydrocarbon gas and air via the supply lines 13 and 14, respectively. By contrast, if the control device 17 detects that pressure is too high, then the shut-off valve 19 is opened, and the pressure is reduced by exhausting process gas through the exhaust line causing it to be burned off at the burn-off location 4.

In addition, the control device 17 can be programmed to close the shut-off valve 18 and thereby block the gas feed line 8 in a targeted manner so that no spent process gas can flow into the preparation reactor 6 at selected times. Under such condition, for example, the treatment chamber 3 can be pressurized solely by process gas newly generated in the preparation reactor 6 by the reaction of hydrocarbon gas and air as correspondingly supplied via the respective supply lines 13 and 14.

The control device 17 further continuously monitors the functional state of the catalyst 7 by detecting a differential pressure across the catalyst 7. If the pressure differential across the catalyst 7 is too high relative to a set point, then the control device 17 initiates a burn-out cycle, so that soot and other debris in the catalyst that are clogging the catalyst can be burned out and removed to clean the catalyst.

In the embodiment shown in FIG. 1, the process gas preparation device 5 is completely integrated into (i.e., housed in) the industrial furnace. This is preferably realized by structurally locating the preparation reactor 6 underneath the treatment chamber 3. The mass flow controllers 15 and 16 are installed in a gas mixer tap of the industrial furnace 2 and the control device 17 is located in a control cabinet of the industrial furnace.

Figure 2:
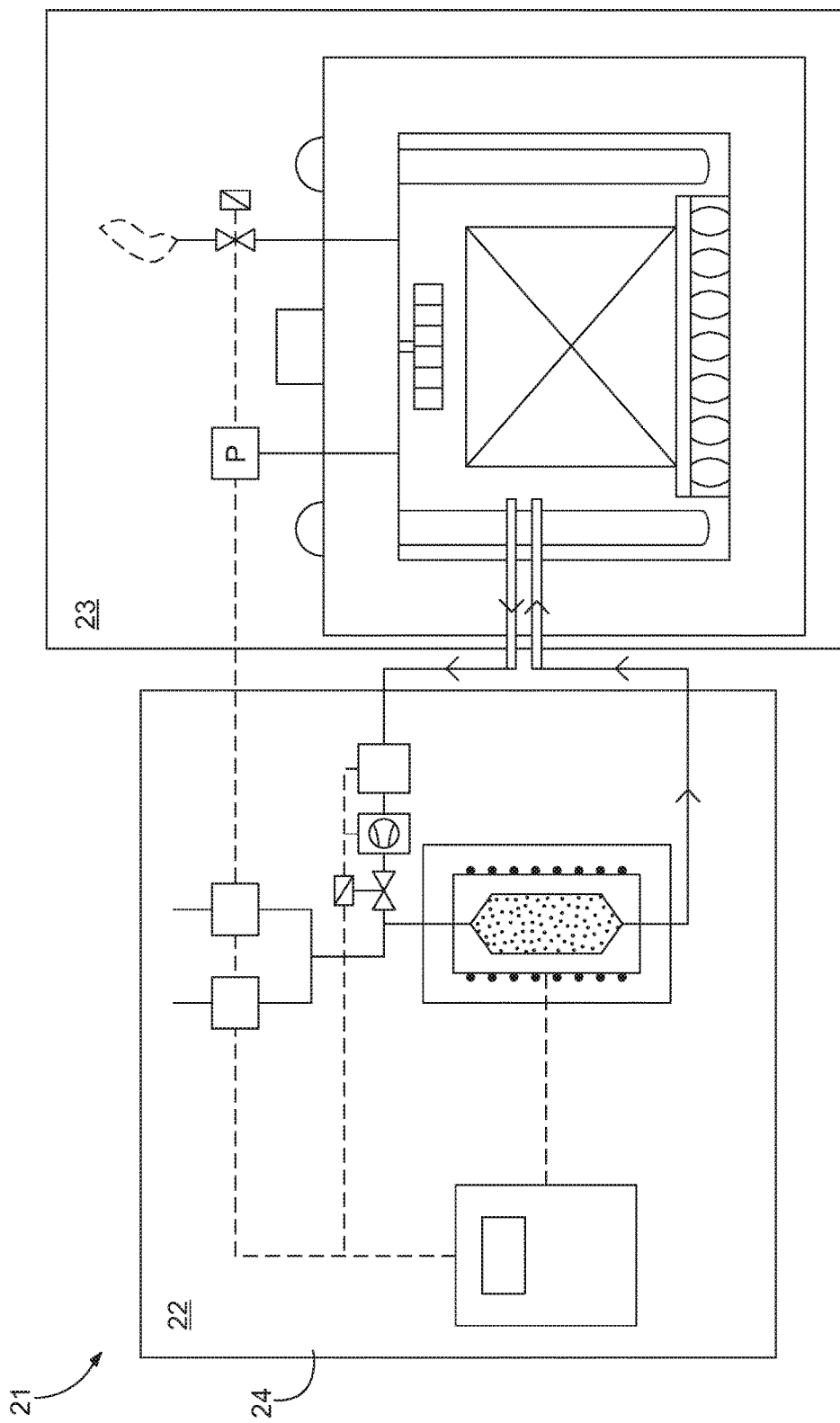
FIG. 2 is a schematic illustration of an industrial furnace system with a process gas preparation device according to the invention corresponding to a second embodiment of the invention.

FIG. 2 depicts a second embodiment of an industrial furnace system 21, which corresponds to the embodiment of FIG. 1 with respect to the essential features of the gas preparation device. The difference of the embodiment of FIG. 2 is that the process gas preparation device 22 is not integrated into (i.e., not housed in) the industrial furnace 23. Rather it is connected externally to the industrial furnace as a separate, preferably self-contained, unit. To this end, the components of the process gas preparation device 22, already described for the embodiment of FIG. 1, as gas preparation device 5, are installed in a housing 24 which is separate from the housing of the industrial furnace 23. Otherwise, the embodiment according to FIG. 2 corresponds to the embodiment according to FIG. 1.

Process gas preparation can be optimally configured with the embodiments according to the invention of a process gas preparation device along with an industrial furnace system that includes such a gas preparation device.

REFERENCE LIST

1 Industrial furnace system
2 Industrial furnace
3 Treatment chamber
4 Burn-off location
5 Process gas preparation device
6 Preparation reactor
  6a Thermally insulated housing
  6b Heating elements
  6c Reactor chamber
7 Catalyst
  7a Catalyst container
  7b Catalytic material
8 Feed line
9 Compressor
10 Cooler
11 Return line
12 Process gas lance
13 Hydrocarbon gas supply line
14 Air supply line
15 Mass flow controller (hydrocarbon gas)
16 Mass flow controller (air)
17 Control device
18 Gas feed line shut-off valve
19 Exhaust line shut-off valve
20 Pressure sensor
21 Industrial furnace system
22 Process gas preparation device
23 Industrial furnace
24 Housing
25 Difference pressure measurement device

The invention claimed is:

1. A process gas preparation device for an industrial heat treating furnace system, said gas preparation device comprising:
   a preparation reactor that contains a catalyst;
   a gas feed line connected for conducting spent process gas from a treatment chamber of the industrial furnace system to the preparation reactor;
   a gas return line for conducting process gas from the preparation reactor back to the treatment chamber;
   a compressor connected in the gas feed line upstream from the preparation reactor;
   a hydrocarbon gas supply line and an air supply line connected to the preparation reactor;
   a shut-off valve connected in the gas feed line;
   a first mass flow controller connected to the hydrocarbon gas supply line;
   a second mass flow controller connected to the air supply line;
   a pressure difference measurement device; and
   a control device connected to the preparation reactor, to the compressor, to the shut-off valve, to the first mass flow controller, to the the second mass flow controller, and to the pressure difference measurement device for controlling the operation of the gas preparation reactor;
   wherein the control device is programmed to monitor the pressure differential across the catalyst via the pressure difference measurement device and to initiate a burn-out process in the catalyst to remove clogging matter from the catalyst when the pressure differential reaches a preselected set point that indicates a clogged operational condition of the catalyst.

2. The process gas preparation device according to claim 1 comprising a cooler connected in the gas feed line upstream from the compressor.

3. The process gas preparation device according to claim 1 wherein the control device is programmed to control the supply of hydrocarbon gas and the supply of air to the preparation reactor.

4. The process gas preparation device according to claim 3 wherein the control device is connected to the compressor and to the shut-off valve whereby the operation of the compressor and the operation of the shut-off valve can be controlled by the control device.

5. The process gas preparation device according to claim 3 wherein the preparation reactor, the compressor, the first and second mass flow controllers, the shut-off valve, and the control device are contained in a shared housing that is separate from the industrial heat treating furnace.

6. An industrial furnace system for gas carburizing and hardening of metal workpieces comprising:
    an industrial heat treating furnace having a treatment chamber; and
    a process gas preparation device according to claim 1, wherein the preparation reactor is connected with the treatment chamber of the industrial heat treating furnace by a closed loop comprising the gas feed line and gas return line.

7. The industrial furnace system according to claim 6 comprising a burn-off location that is connected to the treatment chamber by an exhaust gas line and the exhaust gas line comprises a shut-off valve by which the exhaust gas line can be shut off.

8. The industrial furnace system according to claim 6 comprising a process gas lance connected to the gas feed line and to the gas return line for guiding the process gas into and out of the treatment chamber.

9. The industrial furnace system according to claim 6 wherein the process gas preparation reactor is at least partially integrated into a housing of the industrial furnace.

10. The industrial furnace system according to claim 6 wherein the process gas preparation reactor is contained in a separate housing provided outside of the industrial heat treating furnace.

* * * * *